(12) United States Patent
Mimouni et al.

(10) Patent No.: US 10,415,208 B2
(45) Date of Patent: Sep. 17, 2019

(54) PILE REMOVAL SYSTEM

(71) Applicants: Nabil Mimouni, Cypress, TX (US); Ronnie Wayne Wills, II, Houston, TX (US)

(72) Inventors: Nabil Mimouni, Cypress, TX (US); Ronnie Wayne Wills, II, Houston, TX (US)

(73) Assignee: Nabil Mimouni Organization, Cypress, TX (US)

( * ) Notice: Subject to any disclaimer, the term of this patent is extended or adjusted under 35 U.S.C. 154(b) by 0 days.

(21) Appl. No.: 15/742,272

(22) PCT Filed: Jul. 7, 2016

(86) PCT No.: PCT/US2016/041351
§ 371 (c)(1),
(2) Date: Jan. 5, 2018

(87) PCT Pub. No.: WO2017/007946
PCT Pub. Date: Jan. 12, 2017

(65) Prior Publication Data
US 2018/0195247 A1 Jul. 12, 2018

Related U.S. Application Data

(60) Provisional application No. 62/189,594, filed on Jul. 7, 2015.

(51) Int. Cl.
*E02D 9/04* (2006.01)
*B23D 57/00* (2006.01)
(Continued)

(52) U.S. Cl.
CPC ........... *E02D 9/04* (2013.01); *B23D 57/0084* (2013.01); *E02B 2017/0052* (2013.01); *E02D 9/02* (2013.01)

(58) Field of Classification Search
CPC combination set(s) only.
See application file for complete search history.

(56) References Cited

U.S. PATENT DOCUMENTS 2,304,793 A 12/1942 Bodine, Jr.
3,020,965 A * 2/1962 Keller, Jr. ................ E02D 9/02
175/324

(Continued)

FOREIGN PATENT DOCUMENTS

EP 0319204 6/1989
WO 2006041154 4/2006
WO 2017007946 1/2017

OTHER PUBLICATIONS

"PCT Application No. PCT/US2016/41351 International Search Report", dated Sep. 27, 2016, 9 pages.
(Continued)

*Primary Examiner* — Kyle Armstrong
(74) *Attorney, Agent, or Firm* — DeLizio Law, PLLC

(57) ABSTRACT

Some embodiments include an apparatus for cutting a pile. In some embodiments, the apparatus includes a shaft module including a cylindrical shaft including a first cavity configured to receive the pile. In some embodiments, the apparatus also includes a cutting module coupled to the shaft module, the cutting module including a second cavity configured to receive the pile, clamps configured to clamp onto the pile, and a saw configured to cut the pile. In some embodiments, the apparatus also includes a drilling module coupled to the cutting module, the drilling module including blades to burrow into an earth surface.

14 Claims, 29 Drawing Sheets

(51) Int. Cl.
*E02B 17/00* (2006.01)
*E02D 9/02* (2006.01)

(56) References Cited

U.S. PATENT DOCUMENTS

| | | | |
|---|---|---|---|
| 4,398,360 A | | 8/1983 | Kessler |
| 4,619,556 A | | 10/1986 | Parra |
| 4,900,198 A | * | 2/1990 | Hoaki .................. E02D 9/005 |
| | | | 405/229 |
| 6,725,950 B2 | | 4/2004 | Palm |
| 2009/0266552 A1 | * | 10/2009 | Barra .................. E21B 19/002 |
| | | | 166/339 |
| 2014/0157964 A1 | | 6/2014 | Davis et al. |

OTHER PUBLICATIONS

"PCT Application No. PCT/US2016/41351 International Preliminary Report on Patentability", dated Feb. 14, 2018, 43 pages.
"European Application No. 16821986.3 European Search Report and Opinion", dated Jul. 11, 2019, 9 pages.

* cited by examiner

900

PILE REMOVAL SYSTEM

RELATED APPLICATIONS

This application claims the priority benefit of U.S. application Ser. No. 62/189,594 filed Jul. 7, 2015.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2015, Nabil Mimouni and Ronnie Wayne Wills II.

FIELD

Embodiments of the inventive subject matter relate generally to the field of cutting systems and more particularly to the field of pile cutting systems.

BACKGROUND

Various industrial structures (e.g., offshore oil platforms) and other large-scale buildings (e.g., bridges, waterfront buildings, etc.) are often deployed in maritime environments. When deployed in maritime environments, these structures may be supported by piles (e.g., concrete piles, steel piles, composite piles, etc.) that extend deep in the seafloor. Over time, these structures and buildings may be decommissioned or otherwise taken out of use. After a structure is decommissioned, various governmental regulations may govern how the structure must be removed from a maritime environment. For example, after an oil production platform is decommissioned, federal regulations may require that the platform, including its concrete piles in the seafloor, be removed from the sea. In some instances, the regulations may mandate that the piles be removed down to a certain depth, such as fifteen feet below the sea floor.

Current technology for removing sea-based piles often utilizes blasting material to blast away the seafloor, exposing the buried piles (e.g., up to 15 feet below the seafloor). After each pile is exposed via blasting, workers (e.g., using robots) may saw-off a portion of the pile, and bury the remainder of the pile. As a result, only a portion of the pile remains beneath the seafloor.

One problem with the above-noted technique is that under-sea blasting may destroy marine wildlife. To protect marine wildlife, government regulations may prohibit blasting when certain marine wildlife is in proximity. To comply with these regulations, workers must cease operations until the specific wildlife is sufficiently distant from the blasting. As workers and equipment sit idle, costs may significantly increase, rendering the removal process unfeasible.

SUMMARY

In some embodiments, an apparatus for cutting a pile comprises a shaft module including a cylindrical shaft including a first cavity configured to receive the pile, a cutting module coupled to the shaft module. The cutting module includes a second cavity configured to receive the pile, clamps configured to clamp onto the pile, and a saw configured to cut the pile. The apparatus also includes a drilling module coupled to the cutting module, the drilling module including blades to burrow into an earth surface.

In some embodiments, the saw includes a diamond wire blade.

In some embodiments, the blades are helically shaped, and wherein the blades are mounted on an external surface of the drilling module.

In some embodiments, the shaft module is configured to couple to a drive mechanism configured to provide a rotational force for rotating the apparatus.

In some embodiments, the rotational force to cause the blades to burrow into the earth surface.

In some embodiments, the shaft module includes a motor configured to provide a rotational force to spin the apparatus and cause the blades to burrow into the earth surface.

In some embodiments, a method for cutting a pile lodged into a seafloor surface includes lowering a pile cutting apparatus around a pile, wherein the pile cutting apparatus envelops the pile. The method also includes spinning the pile cutting apparatus around the pile to burrow the pile cutting apparatus into the seafloor surface. The method also includes clamping the pile cutting apparatus to the pile via clamps contained in the pile cutting apparatus. The method also includes cutting the pile using a saw included inside the pile cutting apparatus, and lifting a portion of the pile and the pile cutting apparatus away from the seafloor surface.

In some embodiments, the portion of the pile resides at least partially below the seafloor surface.

In some embodiments, wherein the spinning results from a rotational force applied, on the pile cutting apparatus, from a motor residing on a boat.

In some embodiments, the spinning results from a rotational force originating in the pile cutting apparatus.

In some embodiments, the pile cutting apparatus includes a drilling module including helical blades configured to burrow into the seafloor surface.

In some embodiments, the cutting is performed by a cutting module including a saw motor, cutting wire, and pulleys configured to maintain tension in the cutting wire as the cutting wire passes through the pile.

In some embodiments, an apparatus for removing a portion of a pile that is lodged in a seafloor includes a drilling module configured to envelop the pile and drill into the seafloor by rotating around the pile. The apparatus also includes a cutting module coupled to the drilling module and configured to envelop the pile. The cutting module includes a saw configured to cut-off the portion of the pile.

In some embodiments, the drilling module includes helical blades mounted on an outer surface of the drilling module.

In some embodiments, the cutting module includes a lower rotating ring, a middle rotating ring, and an upper rotating ring in a stack, wherein each rotating ring includes a first tab, second tab, and a mobile pulley mounted on the second tab.

In some embodiments, a saw wire rides on the mobile pulleys that are mounted on the lower rotating ring, middle rotating ring, and upper rotating ring.

In some embodiments, rotation of the lower rotating ring causes the second tab of the lower rotating ring to engage the first tab of the middle rotating ring causing rotation of the middle rotating ring.

In some embodiments, rotation of the lower rotating ring and middle rotating ring will cause the wire saw to cut the pile.

In some embodiments, the apparatus further comprises a shaft module coupled to the cutting module, and configured to envelop the pile, the shaft module including a motor configured to apply a rotational force to the drilling module to drill into the seafloor.

In some embodiments, the motor includes a motor gear configured to drive spur gears, wherein the spur gears are configured to drive an internal gear configured to spin the apparatus.

In some embodiments, the drilling module includes a clamp configured to hold the apparatus fast to the pile, after drilling into the seafloor.

BRIEF DESCRIPTION OF THE FIGURES

The present invention is illustrated by way of example and not limitation in the Figures of the accompanying drawings in which.

DESCRIPTION OF THE EMBODIMENTS

Introduction

Embodiments of the inventive subject matter include techniques and equipment for removing piles and other structures from the seafloor. This description uses the terms pile removing apparatus and pile cutting apparatus synonymously.

Figure 1:
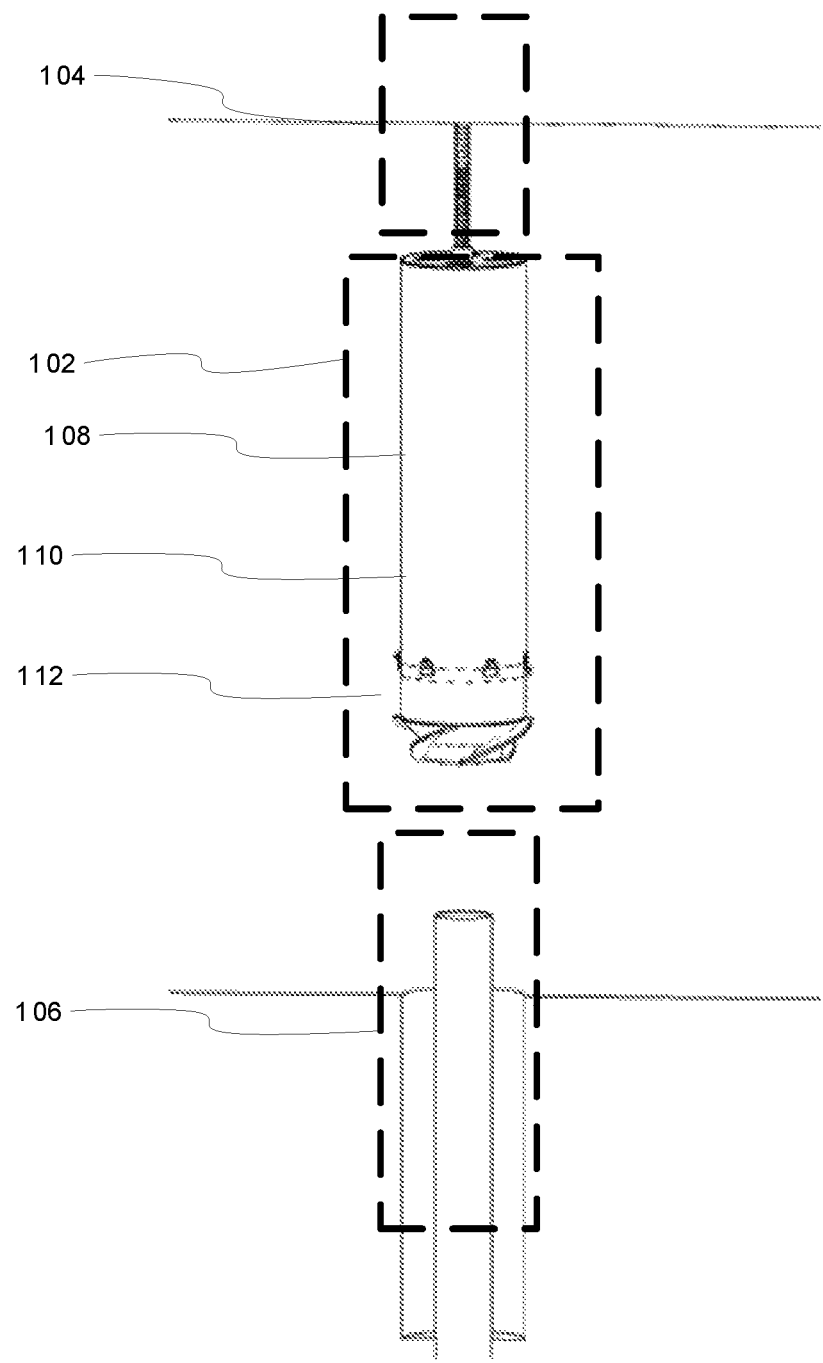
FIG. 1 is a perspective view of an embodiment of the cylindrical apparatus 102 being deployed from a boat.

Some embodiments include a cylindrical pile removing apparatus deployed from a boat into the sea. FIG. 1 is a perspective view of an embodiment of the pile removing apparatus 102 being deployed from a boat. The pile removing apparatus may be connected, by a drive shaft 104, to a rotational power source residing on the boat (not shown). Alternatively, the pile removing apparatus may include its own rotating power source. In either case, an operator can lower the apparatus 102 over (i.e., enveloping) a pile 106. In some instances, the operator lowers the apparatus 102 until the apparatus contacts the seafloor. At this point, the cylindrical apparatus 102 envelops a portion of the pile 106 that is protruding above the seafloor. The apparatus includes a shaft module 108, cutting module 110, and drilling module 112.

In some embodiments in which the rotational force is provided by the apparatus itself, the shaft module 108 includes clamps that telescope out of the shaft module 108, and clamp onto the pile 106. After the clamps engage the pile, the apparatus can rotate about the pile to drill into the seafloor.

Figure 2:
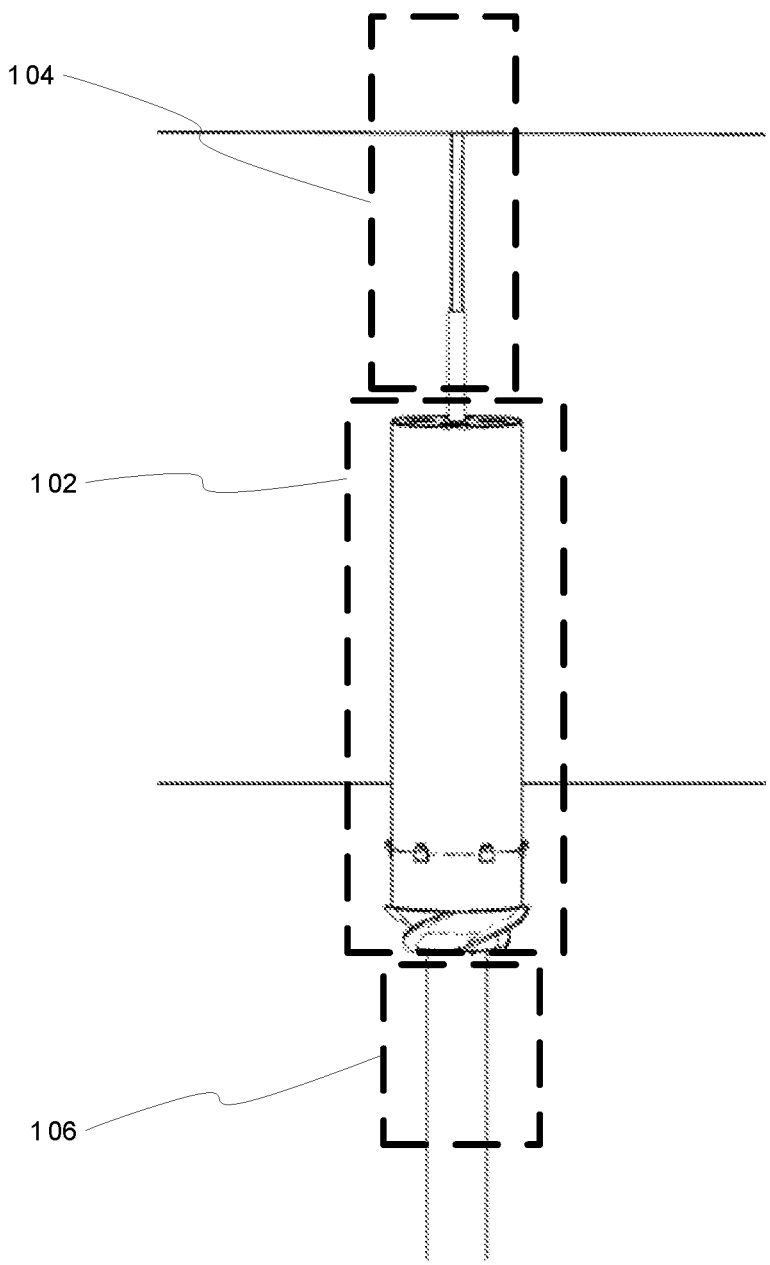
FIG. 2 is a perspective view of the cylindrical apparatus 102 enveloping the pile 106.
Figure 3:
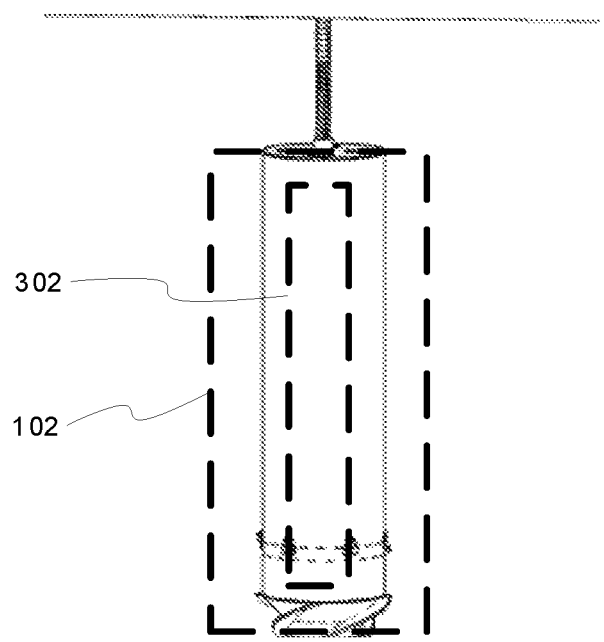
FIG. 3 is a perspective view of the cylindrical apparatus 102 carrying the pile 106 to the sea surface.
Figure 3:
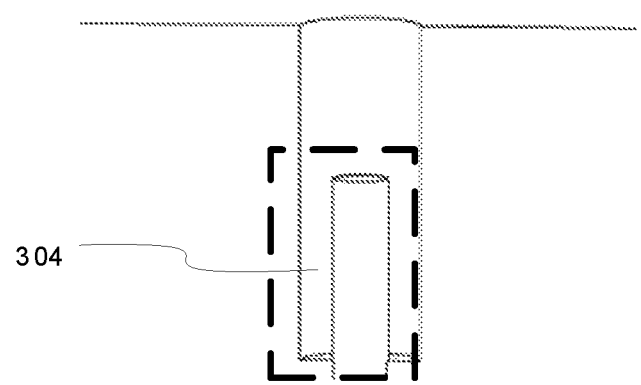

Powered by the rotational power source, the apparatus 102 burrows into the seafloor to a suitable depth (see FIG. 2), saws-off a portion of the pile, and carries the portion 302 to the surface (see FIG. 3). A stub 304 remains under the seafloor. As a result, the apparatus 102 has removed a large portion of the pile (e.g., to a specified depth beneath seafloor) without utilizing blasting material, and with relatively little disturbance the marine wildlife.

Description of Embodiments

Figure 4:
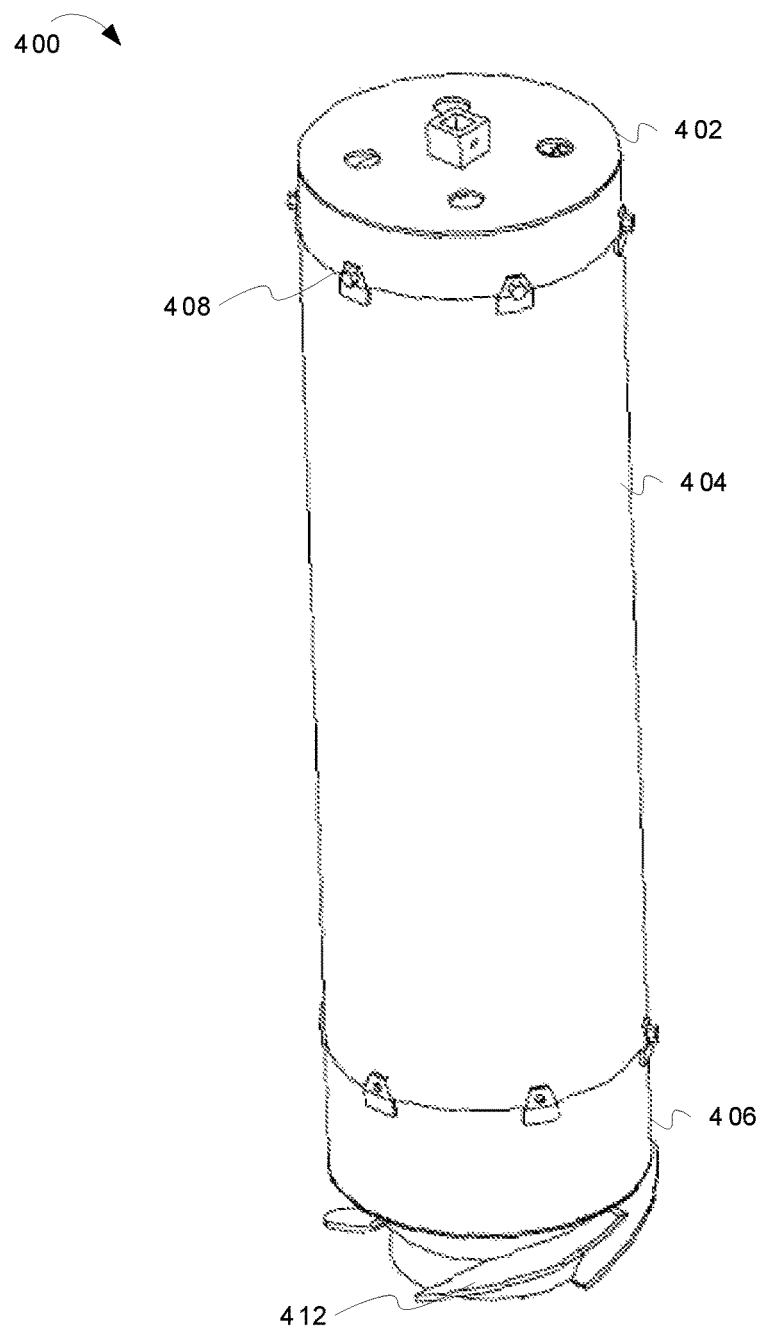
FIG. 4 is a perspective view of an pile removing apparatus, according to some embodiments of the inventive subject matter.

FIG. 4 is a perspective view of a pile removing apparatus, according to some embodiments of the inventive subject matter. As shown, the pile removing apparatus 400 includes three main components—a drive module 402, shaft module 404, and drilling module 406. The drive module 402 is coupled with the shaft module 404 via a connection interface 408 that may include fasteners and other suitable coupling devices. The shaft module 404 may be similarly connected to the drilling module 406. As shown, the drive module 402 includes an interface for connecting to a driveshaft and external rotational power source (e.g., electric motor, combustion engine, etc.). Although not shown, the pile removing apparatus 400 includes a cylindrical cavity (inside the modules) for receiving a pile during the pile removal process. Although some embodiments saw-off pile portions that are taken to the surface in the cavity, other embodiments need not utilize a sawing mechanism. In such embodiments, the pile removing apparatus 400 burrows to a depth deeper than the pile, and removes the pile without sawing it. As a result, some embodiments of the pile removing apparatus 400 may not include the cutting components described herein.

Figure 5:
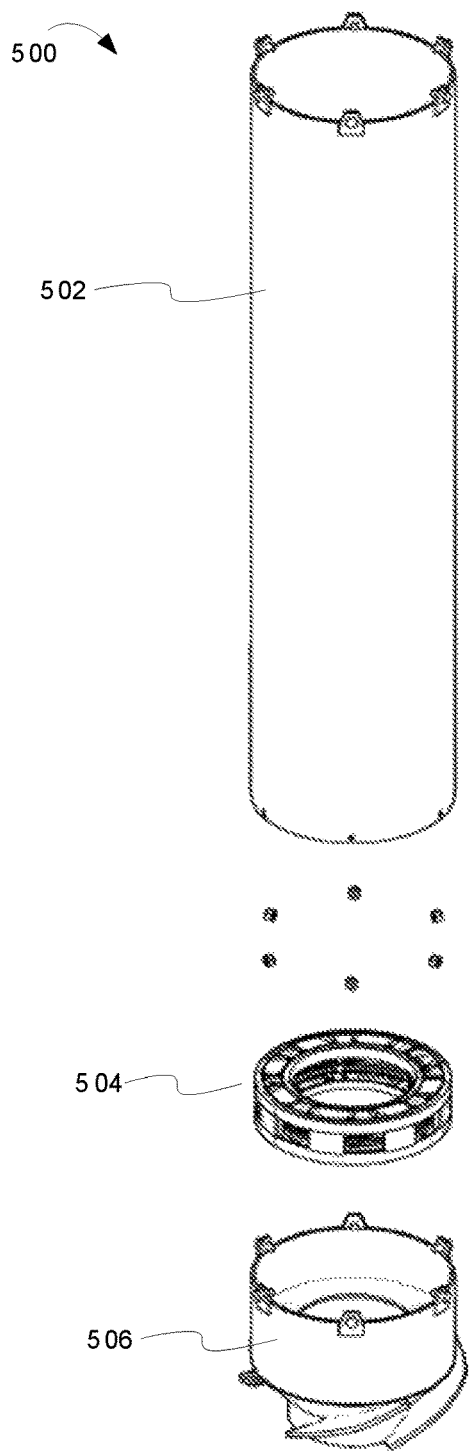
FIG. 5 is an exploded view of portions of an pile removing apparatus, according to some embodiments of the inventive subject matter.

FIG. 5 is an exploded view of portions of a pile removing apparatus, according to some embodiments of the inventive subject matter. FIG. 5 shows portions of a pile removing apparatus 500, including a shaft module 502, cutting module 504, and drilling module 506. The shaft module 502 and drilling module 506 may be similar to those shown in FIG. 4. In some embodiments, the cutting module 504 is disposed within the shaft module 502. The cutting module 504 may include a cable saw for cutting-off the pile. For example, the cutting module 504 may include motors that spin a cable, and pull the spinning cable through the pile. In operation, after the pile removing apparatus 500 envelops a pile, the cutting module 504 severs a portion of the pile.

The following discussion of FIGS. 6-12 will provide details about embodiments of the drilling module.

Figure 6:
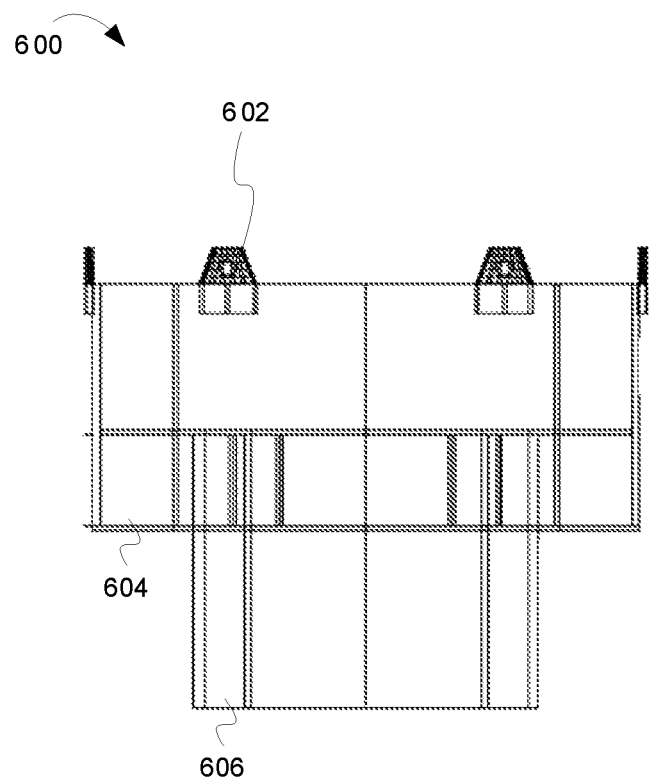
FIG. 6 is a partial side view of a drilling module 600, according to some embodiments.

FIG. 6 is a side view of a drilling module 600, according to some embodiments. Like all components of the pile removing apparatus, the drilling module 600 can be any suitable size. In some embodiments, the drilling module may be 3 to 6 feet in height. The drilling module 600 includes connecting plates 602 used for coupling the cutting module 600 to a shaft module of the pile removing apparatus. In some embodiments, the drilling module 600 can include an outer pipe 604, and an inner pipe 606. For clarity, the drilling module's blades are not shown in FIG. 6.

Figure 7:
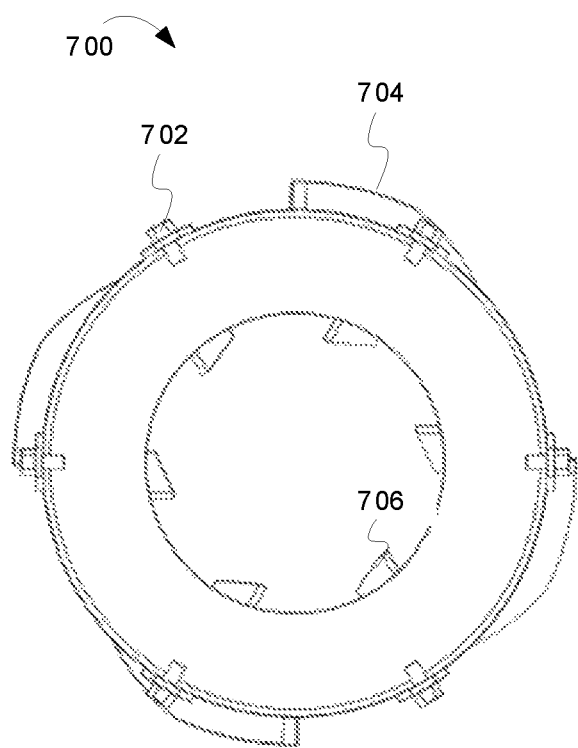
FIG. 7 is a top view of a drilling module 700.

FIG. 7 is a top view of a drilling module 700. As shown, the drilling module 700 includes connecting plates 702 for coupling the drilling module 700 to a shaft module of the pile removing apparatus. The drilling module 700 also includes helical blades 704, and inner blades 706. As the drilling module drills into the seafloor, the helical blades 704 and the inner blades 706 move sand and material.

Figure 8:
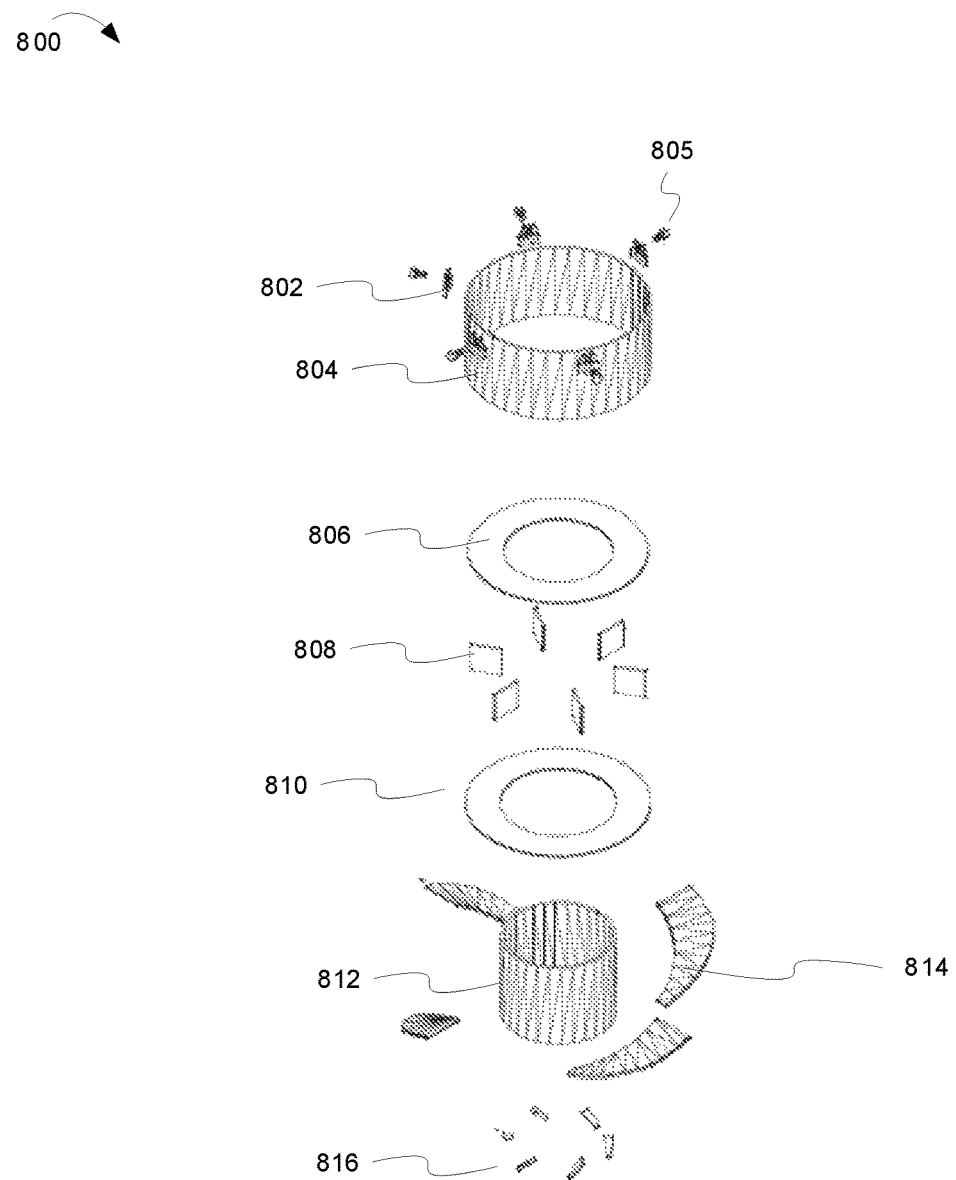
FIG. 8 is an exploded view of a drilling module 800.

FIG. 8 is an exploded view of a drilling module 800. As shown, the drilling module 800 includes connecting plates 802 and bolts 805, which connect the drilling module 800 to a shaft module of a pile removing apparatus. The connecting plates 802 are coupled to a cylindrical outer pipe 804. The drilling module 800 also includes two steel plates (806 and 810) that lay horizontally. The drilling module 800 includes a plurality of vertically oriented steel plates 808. The drilling module 800 also includes an inner pipe 812, which is connected to helical blades 814, and inner blades 816.

Figure 9:
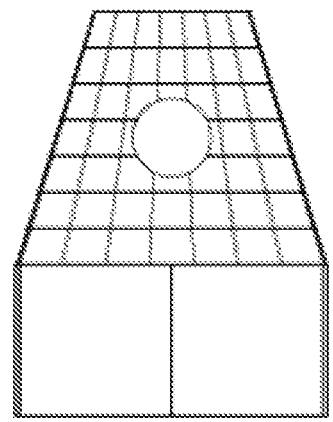
FIG. 9 is a perspective view of a connecting plate 900 of a drilling module.
Figure 9:
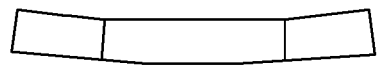

FIG. 9 is a perspective view of a connecting plate 900 of a drilling module. In some embodiments, the connecting plate 900 is similar to the connecting plates noted above. As shown, the connecting plate 900 includes a hole 902 through which a fastener can couple the connecting plate 902 to a shaft module of a pile removing apparatus.

Figure 10A:
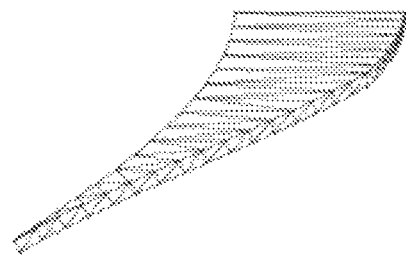
FIG. 10A is a side view of a helical blade of a drilling module.
Figure 10B:
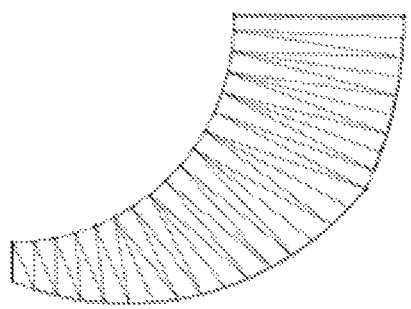
FIG. 10B is top view of the helical blade of the drilling module.
Figure 10C:
FIG. 10C is a side view of an inner blade of a drilling module.

FIG. 10A is a side view of a helical blade of a drilling module. FIG. 10B is top view of the helical blade of the drilling module. FIG. 10C is a side view of an inner blade of a drilling module.

Figure 11A:
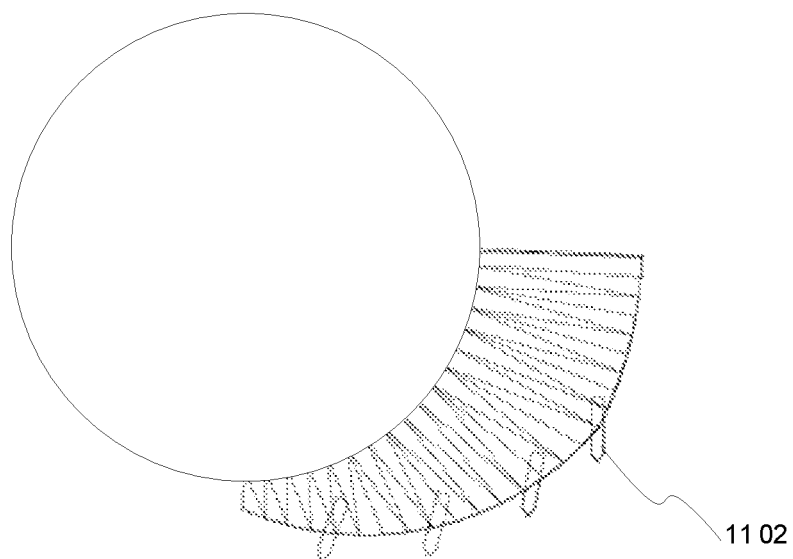
FIG. 11A is a perspective view of a drilling module's helical blade including a plurality of claws, according to some embodiments.
Figure 11B:
FIG. 11B is a top view of a claw, according to some embodiments.

FIG. 11A is a perspective view of a drilling module's helical blade including a plurality of claws, according to some embodiments. As shown, in some embodiments, the helical blades can include claws 1102. In some instances, the claws may be oriented in a plane perpendicular to the blade surface. In other instances, the claws can be oriented in any suitable plane relative to the blade surface. FIG. 11B is a side view of a claw, according to some embodiments.

Figure 12A:
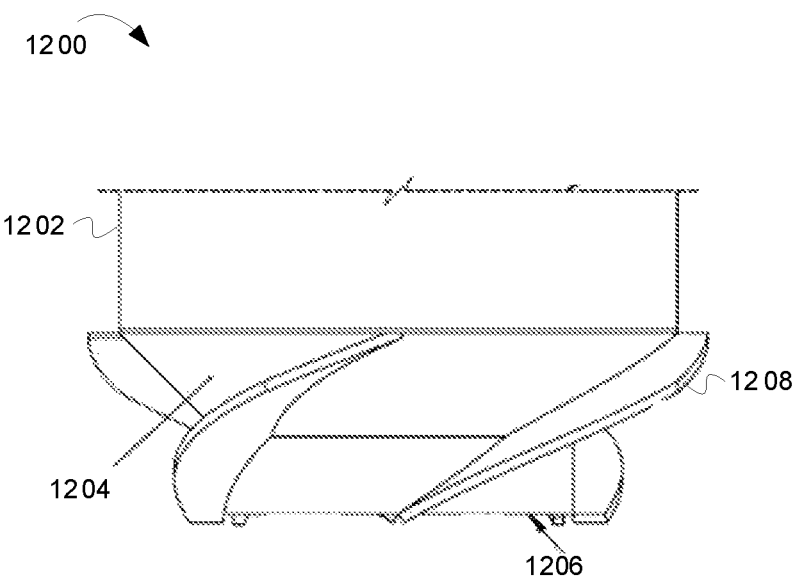
FIG. 12A is a side view of a drilling module 1200.

FIG. 12A is a side view of a drilling module 1200. The drilling module 1200 can include an outer pipe 1202. The drilling module 1200 can also include a metal plate 1204 oriented at 45° relative to the outer pipe 1202. The drilling module 1200 also includes an inner pipe 1206. The inner pipe 1206 may have the same orientation as the outer pipe 1202. As shown, the outer pipe 1202 connects to the metal plate 1204, which connects to the inner pipe 1206. In some embodiments, instead of the metal plate 1204, the drilling module 1200 includes a resin fill that connects the inner and outer pipes. The drilling module 1200 also includes helical blades 1208.

Figure 12B:
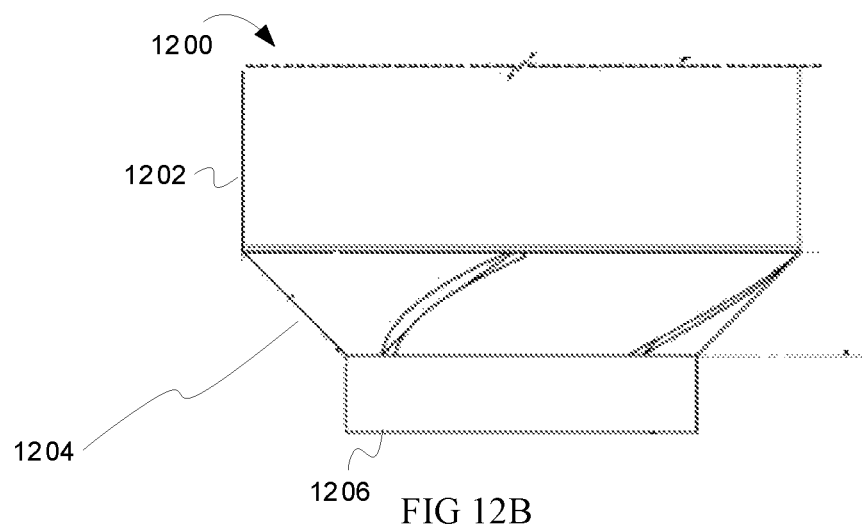
FIG. 12B shows the drilling module 1200 without the helical blades.

FIG. 12B shows the drilling module 1200 without the helical blades. As noted, the metal plate 1204 can be oriented at 45° angle relative to the outer and inner pipes (1202 and 1206).

The following discussion will turn to embodiments of the drive module.

Figure 13:
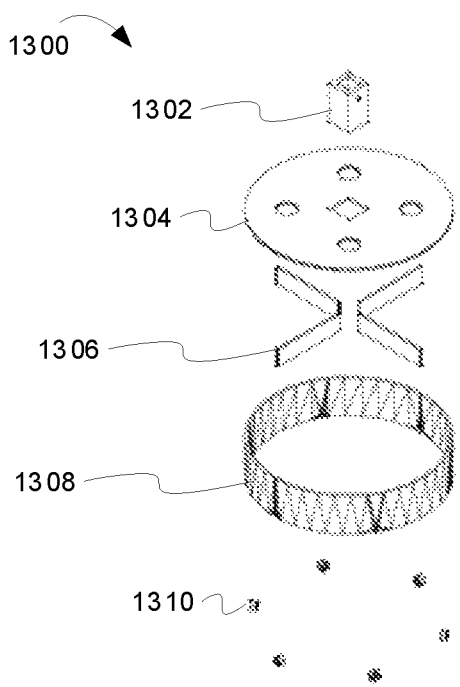
FIG. 13 is an exploded view of a drive module, according to embodiments of the inventive subject matter.

FIG. 13 is an exploded view of a drive module, according to embodiments of the inventive subject matter. As shown, the drive module 1300 includes a kelly bar sleeve 1302. Drive module 1300 also includes a circular top plate 1304, which includes a plurality of circular holes, and a square hole for receiving the kelly bar plate 1302. The drive module 1300 also includes a plurality of rectangular flat plates 1306, which are oriented perpendicularly to the circular plate 1304. Additionally, the drive module 1300 includes a top module shaft 1308. The top module shaft 1308 includes nuts 1310 coupled to an inside surface of the top module shaft 1304. In some embodiments, the nuts 1310 are welded inside the top module shaft, forming a ring pattern. As noted above, the drive module 1300 can connect to a drive shaft or other power source that provides a rotational force to spin the pile removing apparatus and drill into the Earth.

Figure 14:
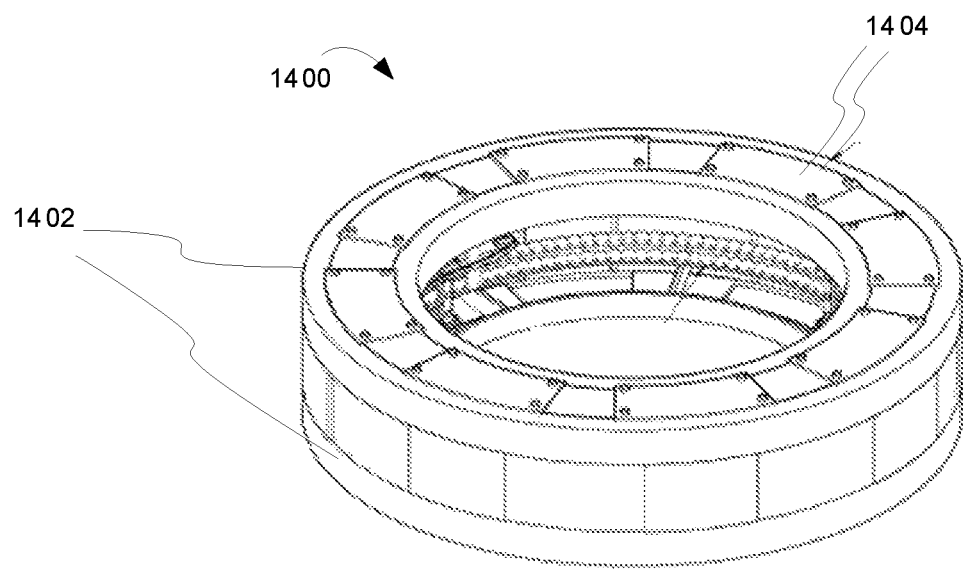
FIG. 14 is a perspective view of a cutting module of an embodiment of the pile removing apparatus.

FIG. 14 is a perspective view of a cutting module of an embodiment of the pile removing apparatus. In FIG. 14, the cutting module 1400 includes a protective housing comprising rings 1402 and plates 1404. The rings and plates can be made of steel or any other suitable material. Inside the housing, the cutting module includes components for cutting-off piles and other structures.

Figure 15:
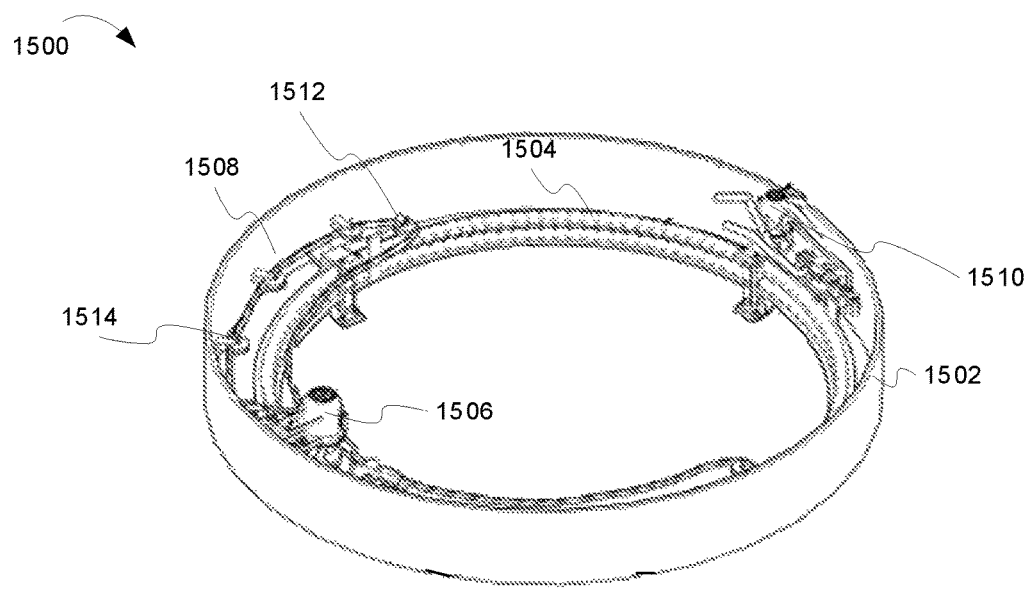
FIG. 15 is a perspective view of components of a cutting module.

FIG. 15 is a perspective view of components of a cutting module. In some embodiments, some of the components are contained within a protective housing (e.g., see FIG. 14). In FIG. 15, the components 1500 include a support ring 1502, which supports concentric annular gears 1504. The concentric annular gears may include teeth that engage one or more motors that rotate the concentric annular gears 1504. In one embodiment, a motor 1510 rotates the concentric annular gears 1504 as part of a process for cutting a pile. The cutting process may entail pulling a diamond cable 1508 into contact with a concrete pile. The motor 1510 rotates the concentric annular 1504, causing a pulley 1512 (mounted on the gears) to draw the diamond cable 1504 into contact with the pile. A diamond cable motor 1506 rotates the diamond cable 1508 at a speed suitable for cutting the pile.

As shown, the diamond cable 1508 is also supported by fixed pulleys 1514.

Figure 16:
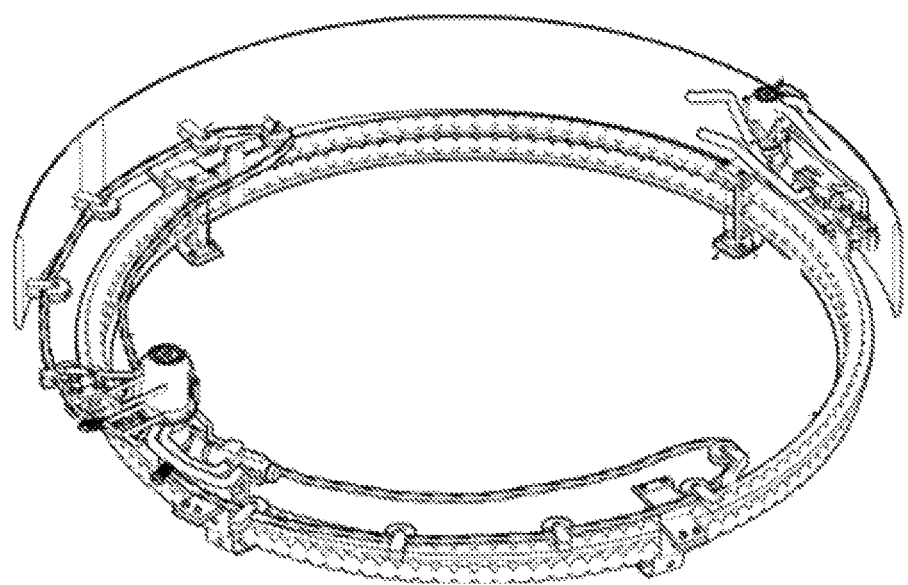
FIG. 16 shows another perspective view of a cutting module components 1500.

FIG. 16 shows another perspective view of a cutting module components 1500.

Figure 17:
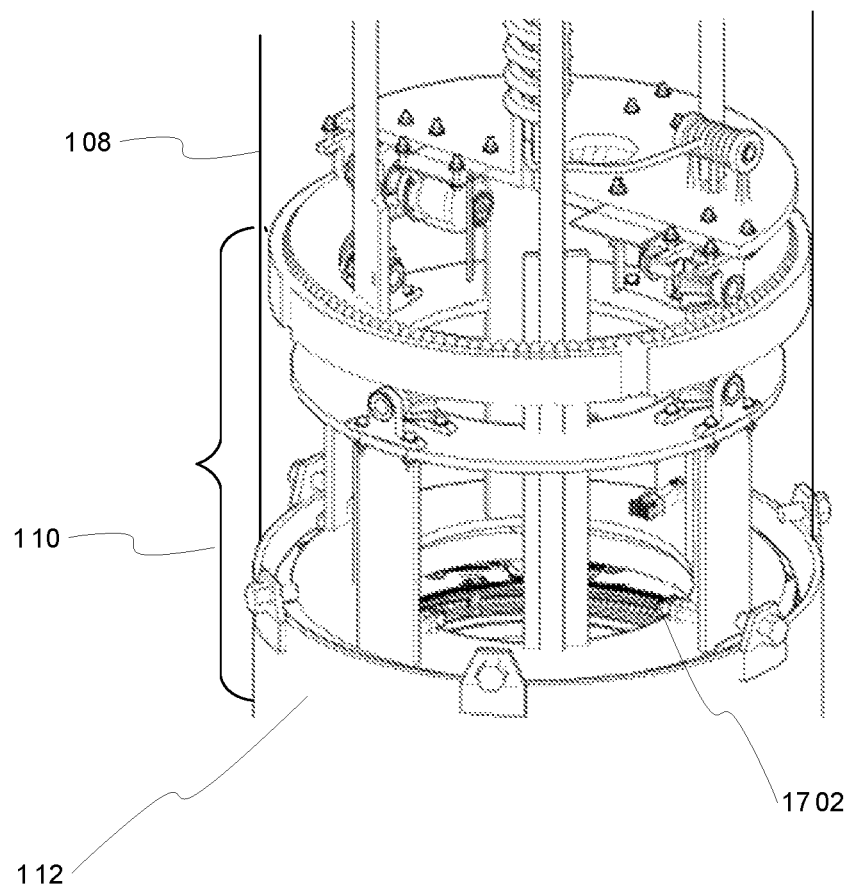
FIG. 17 shows a perspective view of the pile cutting apparatus of FIG. 1.

FIG. 17 shows a perspective view of the pile cutting apparatus of FIG. 1. In FIG. 17, the pile cutting apparatus includes a drive module 108, shaft module 110, and drilling module 112. Clamps 1702 telescope out of the drive module 108 and clamp onto the pile, enabling the pile cutting apparatus to burrow into the seafloor by rotating about the pile. The clamps 1702 telescope out to the pile, and retract back into the drive module 108. In FIG. 17, the clamps include hydraulic cylinders that push arms into contact with a pile. Other embodiments may include other suitable clamping mechanisms.

Figure 18:
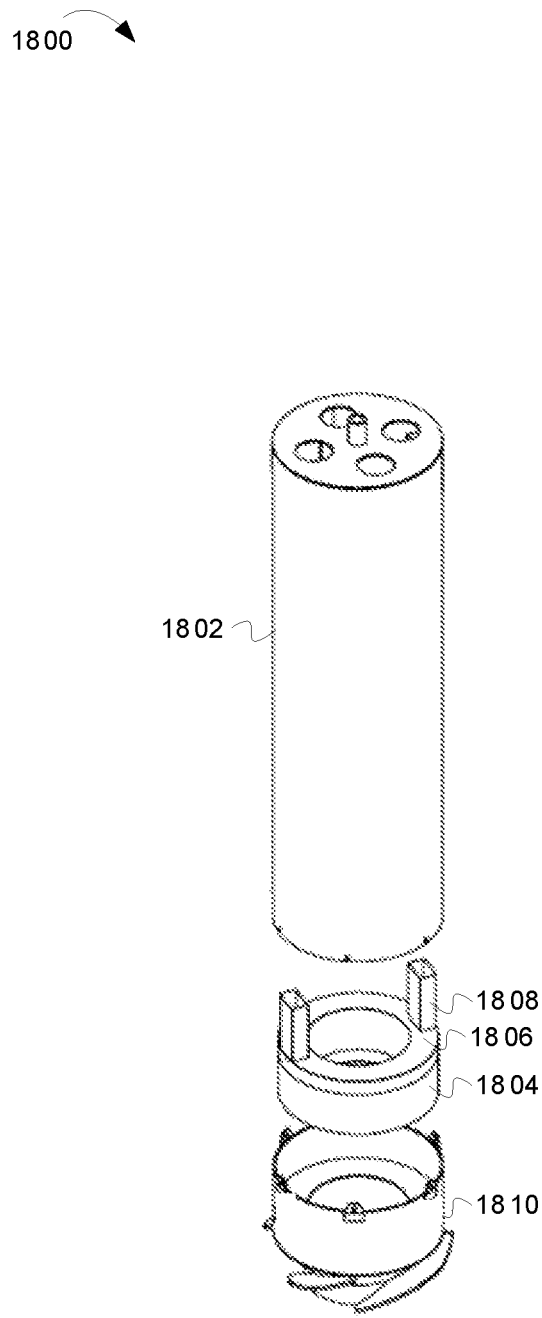
FIG. 18 shows a perspective view of certain components of a pile removing apparatus 1800, according to some embodiments of the inventive subject matter.

FIG. 18 shows a perspective view of certain components of a pile removing apparatus 1800, according to some embodiments of the inventive subject matter. In FIG. 18, the components include a shaft module 1802, cutting module 1804, and drilling module 1810. As shown, a cutting module cap 1806 covers the cutting module 1804. The shaft module 1802 includes sockets for receiving the cap's connecting arms 1808. The cap 1806 protects components (e.g., hydraulic motors, pulleys, cutting wire, etc.) internal to the cutting module 1804.

Figure 19:
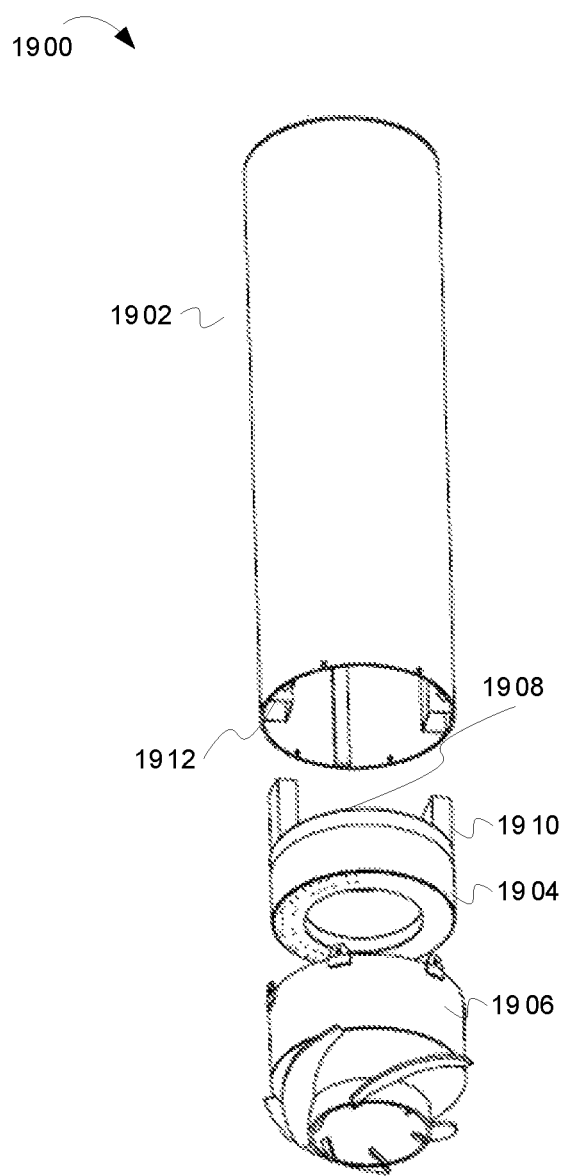
FIG. 19 shows an exploded view of certain components of a pile removing apparatus 1900.

FIG. 19 shows an exploded view of certain components of a pile removing apparatus 1900. The components include a shaft module 1902, cutting module 1904, and drilling module 1906. As shown, a cutting module cap 1908 includes connecting arms 1910 that mate with sockets 1912 in the shaft module 1902, coupling the cutting module 1904 with the shaft module 1902.

Figure 20:
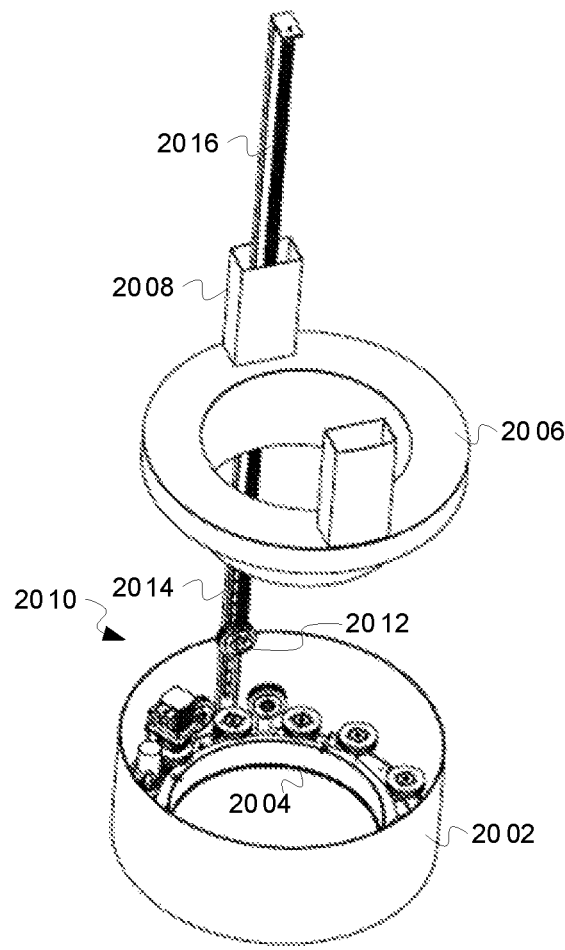
FIG. 20 shows the cutting module with top cover lifted.

FIG. 20 shows an exploded view of certain components of a pile removing apparatus. As shown, a cutting module 2002 includes components for sawing piles (e.g., motor, pulleys, etc.). The cutting module 2002 is configured to couple with a cutting module cap 2006. The cutting module cap 2006 includes housings 2008 that slide into shaft module housings (not shown). In some embodiments, a pulley system 2010 telescopes through one of the housings 2008, and up into a shaft module (e.g. see sockets 1912 in FIG. 19). The pulley system 2010 includes a vertical pulley support 2016 and a spring 2014 for applying a vertical force to a pulley 2012. The pulley 2012 transfers the vertical force to a wire saw (not shown) that is controlled by cutting components in the cutting module 2002 (e.g., motor, pulleys, etc.). That is, the spring 2014 maintains tension on the wire saw (not shown) that rides on the pulleys shown in FIG. 21. The components of the cutting module are described in more detail below.

Figure 21:
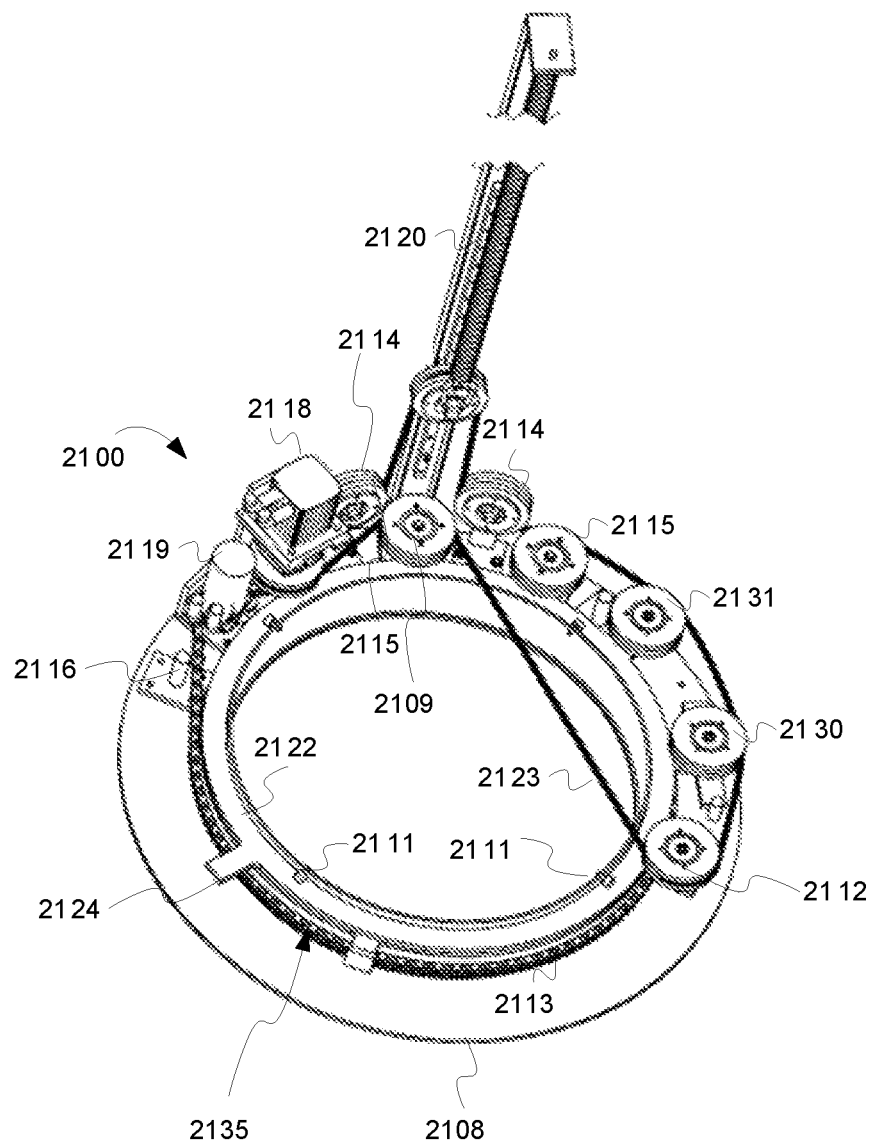
FIG. 21 shows components of a cutting module, according to some embodiments of the inventive subject matter.

FIG. 21 shows components of a cutting module, according to some embodiments of the inventive subject matter. As shown, a cutting module 2100 includes a base plate 2108 on which cutting module components are mounted. A horizontal guide pulley 2115, vertical guide pulleys 2114, wire engine 2118, chain engine 2119, vertical pulley support 2020, and limit bumper 2016 are mounted on the base plate 2108. Three rotating rings are stacked on the base plate 2108, whereby the rotating rings rotate about the pivoting ring 2109. The rotating rings include a lower rotating ring 2135, middle rotating ring, and upper rotating ring 2122 (see FIG. 22 for an exploded view of rotating rings). Each of the rotating rings serves as a mount for one of the mobile pulleys 2112, 2130, & 2131. The mobile pulley 2112 is mounted on the lower rotation ring 2135. The mobile pulley 2130 is mounted on the middle rotating ring, and the mobile pulley 2131 is mounted on the upper rotating ring 2122. In FIG. 21, each of the mobile pulleys 2112, 2130, & 2131 resides on a tab of its respective rotating ring.

During operation, the components shown in FIG. 21 move the wire 2123 into contact with a pile (not shown) disposed inside the pivoting ring 2109. To move the wire 2123, the chain engine 2119 drives a chain 2113 clockwise, causing the lower rotating ring 2122 to rotate clockwise about the pivoting ring 2109. As the lower rotating ring rotates, it moves the mobile pulley 2112 around the circumference of the pivoting ring 2109, thereby moving the wire 2123 across the space inside the pivoting ring 2109. Eventually, the lower rotating ring will rotate far enough so its tab (on which mobile pulley 2112 is mounted) engages a tab of the middle rotating ring. By the lower rotating ring tab engaging the middle rotating ring tab, the chain 2113 can simultaneously rotate both the lower and middle rotating rings, and thus simultaneously rotate the mobile pulleys 2112 & 2130 around the pivot ring 2109. The middle rotating ring includes a tab that engages with the upper rotating ring tab 2124 (after the middle rotating ring has rotated far enough around the pivot ring 2109). When all tabs are engaged, the chain rotates all three rotating rings and pulleys 2112, 2130, & 2131 until the tab 2124 hits the limit bumper 2116, at which point the wire 2123 has passed through the pile. As a result, the mobile pulleys 2112, 2130, & 2131 rotate on the rotating rings to maintain tension on the wire 2123, as the wire 2123 cuts through a pile. The rotating rings are contained and stabilized by rotating ring stabilizers 2111. The wire engine 2118 spins the wire 2123 at a speed that enables the wire 2123 to cut though the pile. Although some embodiments rotate the rotating rings clockwise, other embodiments may rotate them counterclockwise.

Figure 22:
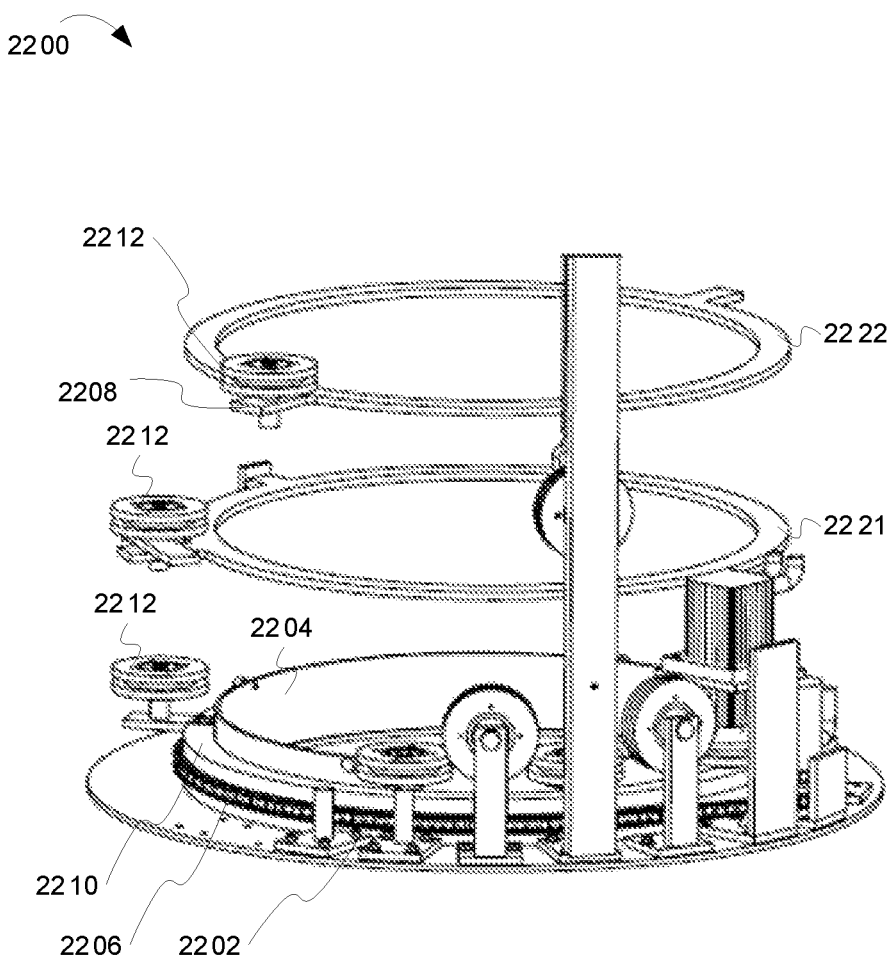
FIG. 22 is an exploded view of components of a cutting module, according to some embodiments of the inventive subject matter.

FIG. 22 is an exploded view of components of a cutting module, according to some embodiments of the inventive subject matter. FIG. 22 shows how rotating rings can be stacked. As shown, a cutting module 2200 includes a base plate 2202 connected to a pivot ring 2204. A chain mechanism 2206 is mounted on the base plate 2202. In some embodiments, three rotating rings are stacked above the chain mechanism. As shown, the rotating rings include an upper rotating ring 2222, middle rotating ring 2221, and a lower rotating ring 2210. Each of the rotating rings 2210, 2221, & 2222 includes a mobile pulley 2212 mounted on a tab 2208. As described above, the mobile pulleys 2212 and rotating rings 2210, 2221, and 2222 rotate about the pivot ring 2204 to move a cutting wire (not shown) into contact with a pile (not shown). The rotating rings 2210, 2221, & 2222 can include additional tabs that control rotation about the pivot ring 2204, as described above. Although some embodiments utilize three rotating rings, other embodiments may use any suitable number of rotating rings.

Figure 23:
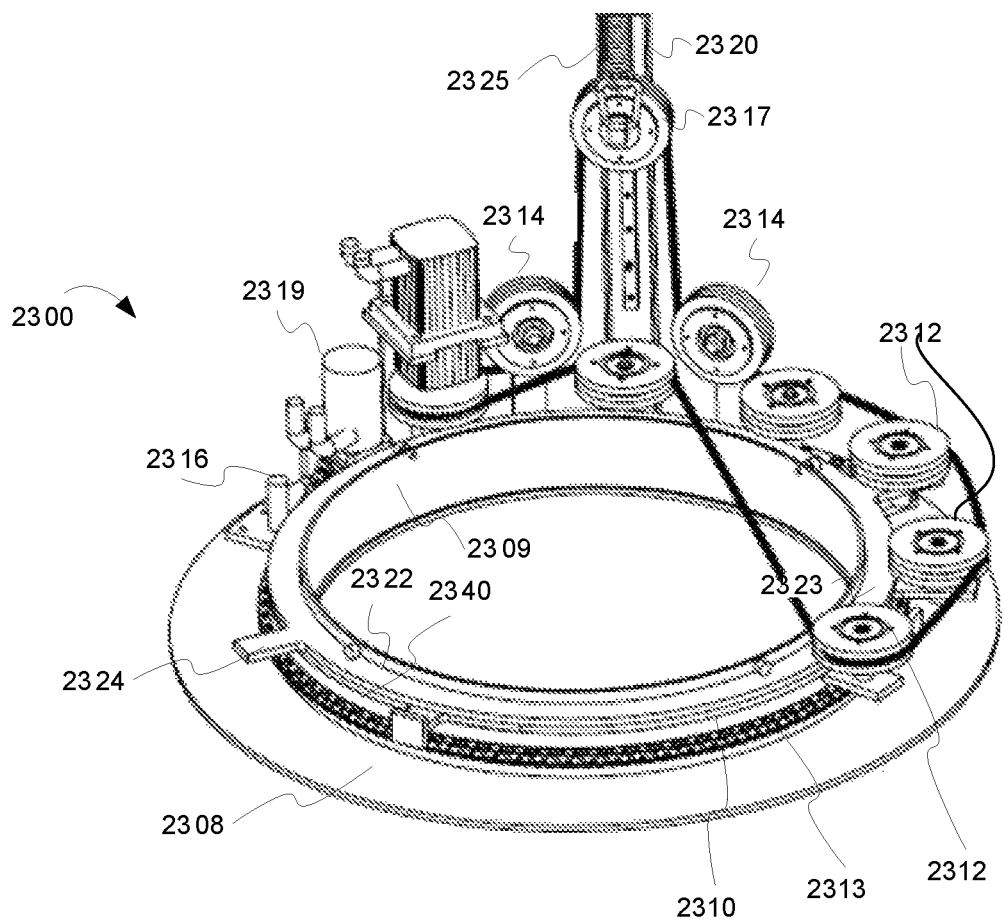
FIG. 23 is another perspective view of components a cutting module, according to some embodiments of the inventive subject matter.

FIG. 23 is another perspective view of components a cutting module, according to some embodiments of the inventive subject matter. In FIG. 23, the cutting module 2300 includes a base plate 2308 and pivot ring 2309. Riding on the base plate 2308 and rotating around the pivot ring 2309 are the upper rotating ring 2322, middle rotating ring 2340, and lower rotating ring 2310.

The cutting module 2300 also includes a chain motor 2319 configured to rotate a chain 2313, where rotation of the chain 2313 causes rotation of a lower rotating ring 2310, middle rotating ring, and upper rotating ring 2322 about the pivot ring 2309. Mobile pulleys 2312 are mounted on the rotating rings. As the rotating rings rotate, the mobile pulleys 2312 move the wire 2323 into contact with a pile disposed inside the ring 2309.

The upper rotating ring 2322 includes a tab 2324 configured to engage the middle rotating ring, as the middle rotating ring 2340 rotates clockwise about the pivot ring 2309. Once engaged, the rotating rings simultaneously rotate until contacting a limit bumper 2316. The pulleys maintain tension on the wire 2323, enabling the wire 2323 to cut a pile.

The vertical guide pulleys 2314 guide the wire 2323 onto the vertical mobile pulley 2317. The vertical guide pulley 2317 moves up-and-down a vertical pulley support 2320. In some embodiments, a spring 2325 applies vertical tension to the vertical guide pulley 2317, moving the vertical guide pulley 2317 up-and-down the support 2320. For example, as the mobile pulleys 2312 rotate clockwise about the pivot ring 2309, the vertical guide pulley 2317 moves down the support 2320, and the spring 2325 stretches downward toward the base plate 2308. As the mobile pulleys 2312 rotate (counterclockwise) back to their original positions, the spring 2325 pulls the vertical mobile pulley 2317 upward along the support 2320.

The pulleys shown in FIGS. 21-23 can be arranged in any suitable fashion that moves the wire (see 2123) into contact with a pile, and completely through the pile.

This description continues with a discussion embodiments that do not require an outside rotational force for turning a pile removing apparatus, as it drills into the earth. As described above, some embodiments of the pile removing apparatus are lowered from a boat that includes a motor for applying a rotational force to the pile removing apparatus. In contrast to these embodiments, other embodiments call for a mechanism by which the pile removing apparatus itself provides a rotational force for drilling into the earth.

Figure 24:
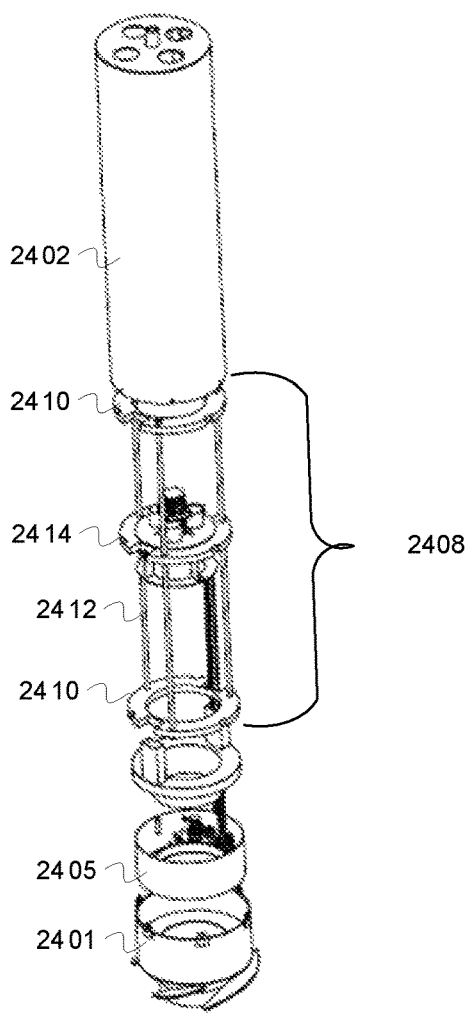
FIG. 24 is an exploded view of a pile removing apparatus including its own motor for drilling into the earth.

FIG. 24 is an exploded view of a pile removing apparatus including its own motor for drilling into the earth. In FIG. 24, the pile removing apparatus 2400 includes a shaft module 2402, cutting module 2405, and drilling module 2401. The shaft module 2402 includes a carriage 2408, which includes carriage rings 2410, and carriage supports 2412. A drilling module 2414 is connected to the carriage supports 2412. The carriage 2408, and drilling module 2414 are described in more detail below.

Figure 25:
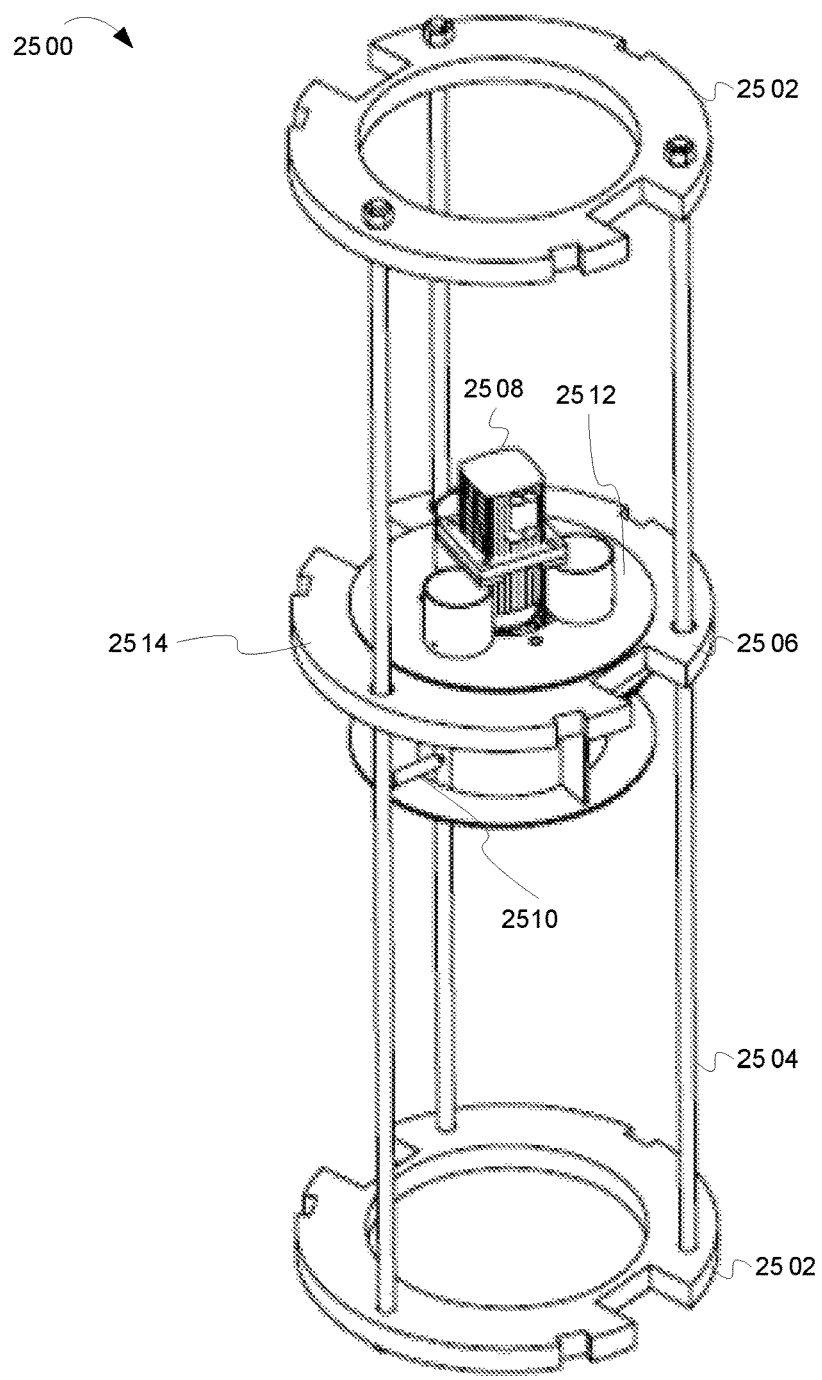
FIG. 25 is a perspective view of carriage 2500, according to some embodiments of the inventive subject matter.

FIG. 25 is a perspective view of carriage 2500, according to some embodiments of the inventive subject matter. As shown, the carriage 2500 includes carriage rings 2502 and carriage supports 2504. A drilling mechanism 2506 is connected to the carriage supports 2504. The drilling mechanism 2506 includes a drilling motor 2508 which includes a drilling gear that engages spur gears mounted on the bottom side of a motor support 2512. The spur gears engage internal gear teeth of an internal gear plate 2514 to spin the carriage 2500, and consequently spin the entire pile removing apparatus. The drilling mechanism 2506 also includes a plurality of hydraulic cylinders 2510 attached on a bottom side of the drilling mechanism 2506. The hydraulic cylinders 2510 are configured to engage a pile and hold the drilling mechanism securely to the pile.

Figure 26:
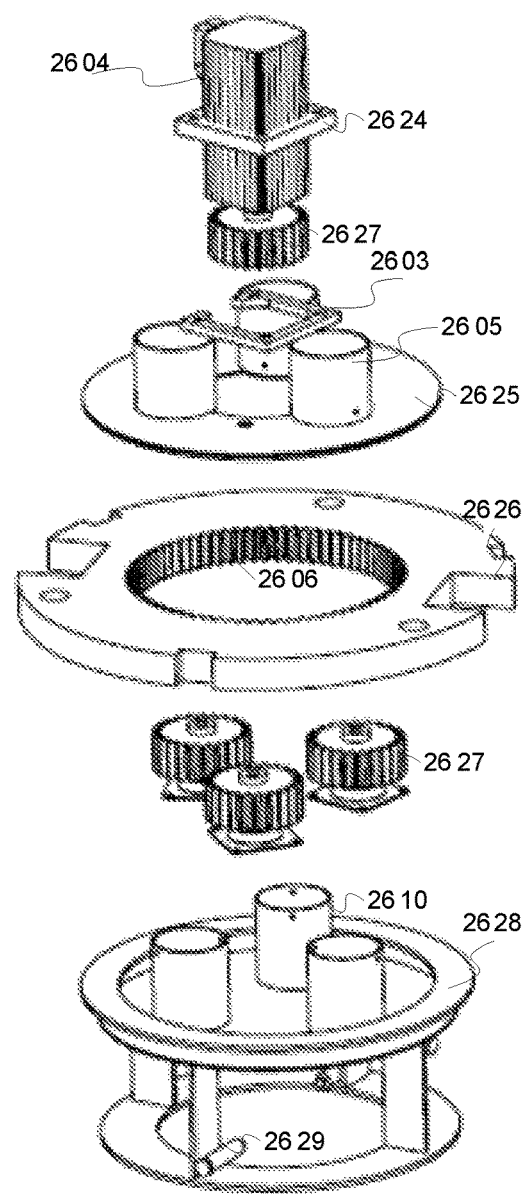
FIG. 26 is an exploded view of a drilling apparatus mechanism, according to some embodiments of the inventive subject matter.

FIG. 26 is an exploded view of a drilling apparatus, according to some embodiments of the inventive subject matter. FIG. 26 shows a drilling apparatus 2600 configured for use in a pile-removal apparatus. The drilling apparatus 2600 includes a drilling motor 2624, which includes a mounting flange 2604 and a drive gear 2627. The drilling motor 2604 is configured for mounting on a motor support 2625. The motor support 2625 includes three cylindrical supports 2605 and a motor mount 2603 configured to support the drilling motor 2624 via the mounting flange 2604.

The motor support 2625 couples with an internal gear plate 2626. The internal gear plate 2626 includes internal gear teeth 2606 configured to engage the spur gears 2627, which in turn engage the drive gear 2627. As the drive gear 2627 spins, it drives the spur gears 2627, which in turn spin the internal gear plate 2626. As the internal gear 2626 spins, the drilling apparatus 2600 spins the entire pile-removal apparatus.

As shown, the drilling apparatus 2600 includes a drilling mechanism support 2628 configured to support the spur gears 2627, and hold them in contact with the drive gear 2627 and internal gear 2626. As shown, the drilling mechanism support includes support cylinders 2610, and other elements that provide structural support. The drilling mechanism support 2628 also includes hydraulic cylinders 2629 configured to clamp onto a pile. After clamped onto a pile, the motor 2624 can cause the internal gear plate 2626 to spin, thereby spinning the entire pile removing apparatus about the pile—drilling into the earth. That is, after the hydraulic cylinders 2629 clamp to a pile, all components other than the internal gear 2626 remain stationary, whereas the internal gear 2626 (and the rest of the pile removing apparatus) rotates about the pile.

As noted, the embodiments shown in FIGS. 25 and 26 do not require an external rotational force to drill the pile removing apparatus into the Earth. In some embodiments, the apparatus itself includes a drilling mechanism that provides such a rotational force.

Any of the motors described herein can be implemented as hydraulic motors, electrical motors, or any other suitable motor type. Any suitable materials can be used to implement the components described herein. For example, the drilling module can be implemented using steel or any other suitable material.

Figure 27:
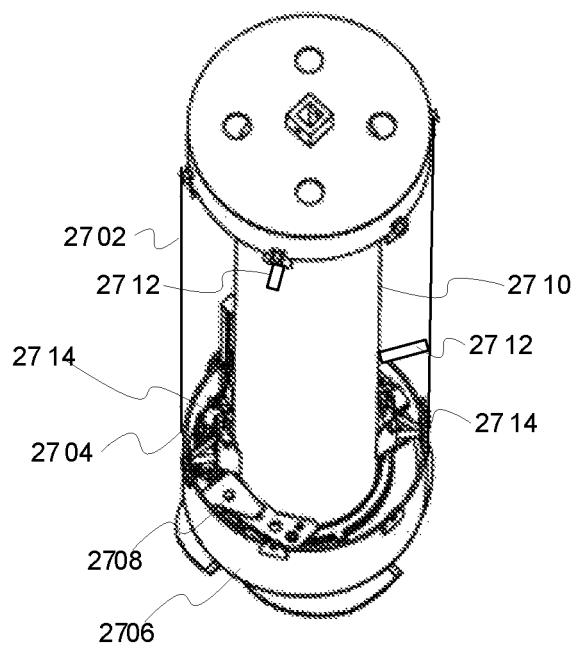
FIG. 27 is a perspective view of a pile removing apparatus, according to some embodiments of the inventive subject matter.

FIG. 27 is a perspective view of a pile removing apparatus, according to some embodiments of the inventive subject matter. In FIG. 27, the pile removing apparatus includes a shaft module 2702, cutting module 2704, and drilling module 2706. As shown, the drilling module 2706 and cutting module 2704 include inner rings for receiving piles into the inside of the apparatus. In the embodiment shown in FIG. 27, a cylindrical inner shield 2710 connects to the top of the shaft module 2702 and to a pivot ring (see discussion above) of the cutting module 2704. The inner shield 2710 seals-off the cutting module's components from sea water and debris, as the pile removing apparatus augurs into the seafloor. Stabilization arms 2712 stabilize the inner shield 2710 inside the shaft module 2702. After the pile removing apparatus reaches its desired depth in the seafloor, hydraulic cylinders 2714 push the inner shield 2710 upward to enable the cutting module's wire saw to move into contact with the pile. After the inner shield 2710 has moved upward, the cutting module's components are exposed to seawater during pile cutting. The cutting module 2704 also includes clamps 2708 rotatably anchored to a base plate in the cutting module 2704. After the hydraulic cylinders 2714 move the inner shield 2710 upward, the clamps 2708 rotate into contact with the pile, and securely hold the pile, as the wire saw cuts the pile.

Figure 28:
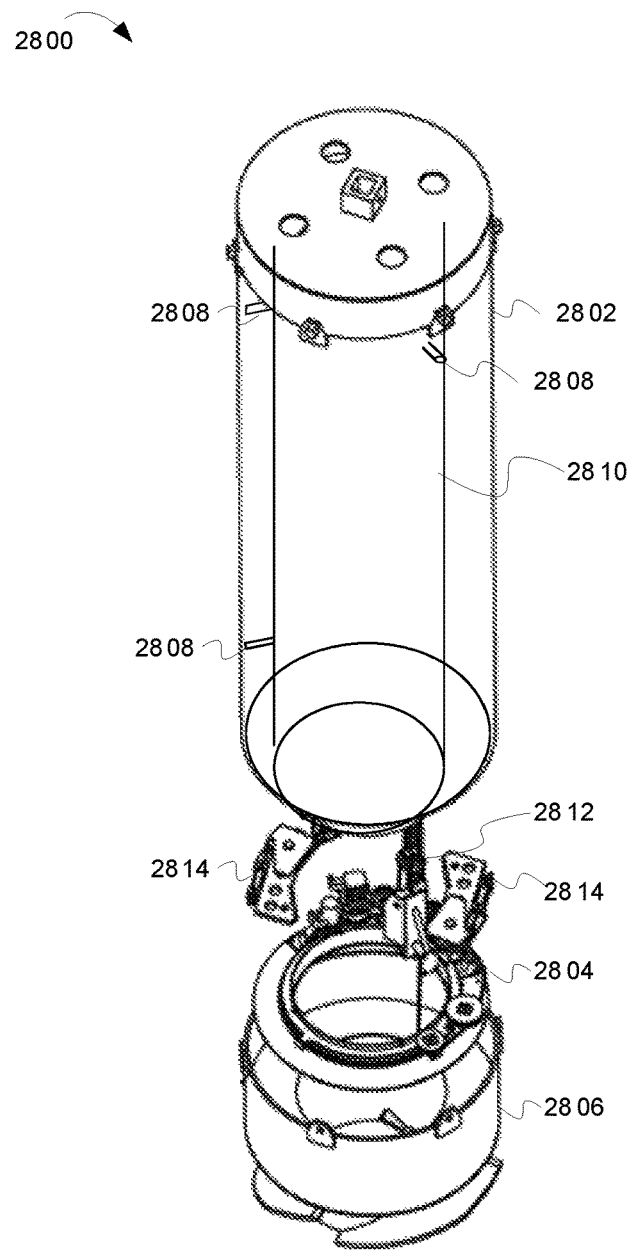
FIG. 28 is an exploded view of a pile removing apparatus, according to some embodiments of the inventive subject matter.

FIG. 28 is an exploded view of a pile removing apparatus, according to some embodiments of the inventive subject matter. In FIG. 28, the pile removing apparatus 2800 includes a shaft module 2802, cutting module 2804, and drilling module 2806. Like the embodiment shown in FIG. 27, the pile removing apparatus 2800 includes an inner shield 2810 that is stabilized by stabilization arms 2808. The stabilization arms 2808 are connected to an inner surface of the shaft module 2802. Also like the embodiment shown in FIG. 27, the cutting module 2804 includes clamps 2814 and hydraulic cylinders 2812.

Figure 29:
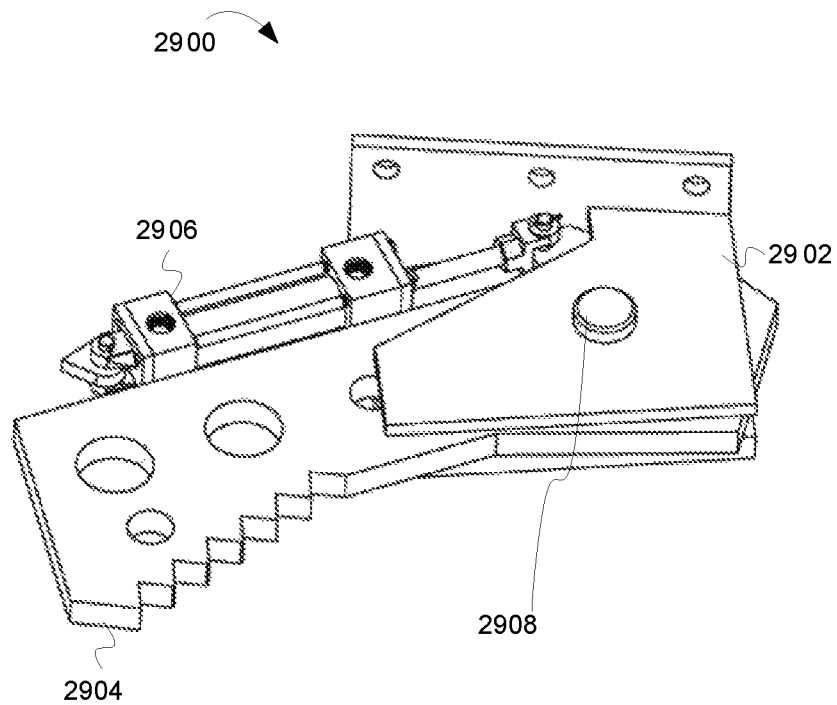
FIG. 29 shows a perspective view of a clamping mechanism, according some embodiments of the inventive subject matter.

FIG. 29 shows a perspective view of a clamping mechanism, according some embodiments of the inventive subject matter. In FIG. 29, a clamping mechanism 2900 includes a clamp 2904, clamp support 2902, and clamp hydraulic cylinder 2906. The clamping mechanism 2900 may be used in some embodiments, such as those shown in FIGS. 27-28. In some embodiments, the clamp support 2902 is anchored to a pivot ring of a cutting module. In other embodiments, the clamps support 2902 may be anchored to any suitable surface. The clamp 2904 may be connected to the clamp support 2902 via a clamp pin 2908, or other suitable means for coupling the clamp 2904 to the clamp support 2902. The clamp 2904 is configured to rotate about the clamp pin 2908. A clamp hydraulic cylinder 2906 is configured to exert a force on the clamp 2904, rotating the clamp 2904 about the pin 2908 and into contact with a pile.

General

This description describes numerous details about embodiments of the invention. However, some embodiments may be practiced without these specific details. In some instances, for sake of clarity, this description omits well-known circuits, structures and techniques. In this description, references to "one embodiment" or "an embodiment" mean that a feature is included in at least one embodiment of the invention. Furthermore, separate references to "one embodiment" do not necessarily refer to the same embodiment. Thus, the present invention can include any combination the embodiments described herein.

The invention claimed is:

1. An apparatus for cutting a pile, the apparatus comprising:
   a shaft module including a cylindrical shaft including a first cavity configured to receive the pile;
   a cutting module coupled to the shaft module, the cutting module including
      a second cavity configured to receive the pile;
      a saw configured to cut the pile;
      a lower rotating ring;
      a middle rotating ring; and
      an upper rotating ring, wherein each rotating ring includes a first tab, second tab, and a mobile pulley mounted on the second tab;
   a drilling module coupled to the cutting module, the drilling module including blades to burrow into an earth surface.

2. The apparatus of claim 1, wherein the cutting module includes clamps to clamp onto the pile.

3. The apparatus of claim 1, wherein the blades are helically shaped, and wherein the blades are mounted on an external surface of the drilling module.

4. The apparatus of claim 1, wherein the shaft module is configured to couple to a drive mechanism configured to provide a rotational force for rotating the apparatus.

5. The apparatus of claim 4, wherein the rotational force to cause the blades to burrow into the earth surface.

6. The apparatus of claim 1, wherein the shaft module includes a motor configured to provide a rotational force to spin the apparatus and cause the blades to burrow into the earth surface.

7. An apparatus for removing a portion of a pile that is lodged in a seafloor, the apparatus including:
   a drilling module configured to envelop the pile and drill into the seafloor by rotating around the pile; and
   a cutting module coupled to the drilling module and configured to envelop the pile, the cutting module including a saw configured to cut-off the portion of the pile; wherein the cutting module includes a lower rotating ring, a middle rotating ring, and an upper rotating ring in a stack, wherein each rotating ring includes a first tab, second tab, and a mobile pulley mounted on the second tab.

8. The apparatus of claim 7, wherein the drilling module includes helical blades mounted on an outer surface of the drilling module.

9. The apparatus of claim 7, wherein the cutting module includes a lower rotating ring, a middle rotating ring, and an upper rotating ring in a stack, wherein each rotating ring includes a first tab, second tab, and a mobile pulley mounted on the second tab.

10. The apparatus of claim 9, wherein a wire of the saw rides on the mobile pulleys that are mounted on the second tab of the lower rotating ring, middle rotating ring, and upper rotating ring.

11. The apparatus of claim 9, wherein rotation of the lower rotating ring causes the second tab of the lower rotating ring to engage the first tab of the middle rotating ring causing rotation of the middle rotating ring.

12. The apparatus of claim 10, wherein rotation of the lower rotating ring and middle rotating ring will cause the wire saw to cut the pile.

13. The apparatus of claim 7 further comprising a shaft module coupled to the cutting module, and configured to envelop the pile, the shaft module including a motor configured to apply a rotational force to the drilling module to drill into the seafloor.

14. The apparatus of claim 12, wherein the motor includes a motor gear configured to drive spur gears, wherein the spur gears are configured to drive an internal gear configured to spin the apparatus.

* * * * *